United States Patent [19]

Underhill, Jr.

[11] 4,275,994
[45] Jun. 30, 1981

[54] ROLL FORMED BLADE STRUCTURE

[75] Inventor: William K. Underhill, Jr., Bedford, Tex.

[73] Assignee: Textron, Inc., Providence, R.I.

[21] Appl. No.: 893,050

[22] Filed: Apr. 3, 1978

[51] Int. Cl.³ .............................................. B64C 11/26
[52] U.S. Cl. ..................................... 416/226; 416/230
[58] Field of Search ................... 416/225, 226, 230 A, 416/237

[56] References Cited

U.S. PATENT DOCUMENTS

| | | | |
|---|---|---|---|
| 2,574,980 | 11/1951 | Meyers | 416/226 |
| 2,596,818 | 5/1952 | Meyers | 416/226 |
| 2,828,531 | 4/1958 | Bath | 29/156.8 |
| 2,863,513 | 12/1958 | Metzger | 416/226 X |
| 2,884,077 | 4/1959 | Stamm et al. | 416/226 |
| 2,884,078 | 4/1959 | Stamm et al. | 416/226 |
| 2,965,530 | 12/1960 | Stamm et al. | 154/116 |
| 3,002,567 | 10/1961 | Stulen et al. | 416/226 |
| 3,200,477 | 8/1965 | Shultz | 29/156.8 H |
| 3,217,807 | 11/1965 | Underhill et al. | 416/226 |
| 3,528,753 | 9/1970 | Dutton et al. | 416/226 |
| 3,552,881 | 1/1971 | Rogers et al. | 416/145 |
| 3,674,379 | 7/1972 | Monti | 416/226 |
| 3,799,700 | 3/1974 | Broekhuizen et al. | 416/226 |
| 3,813,186 | 5/1974 | Palachek et al. | 416/226 |
| 3,829,240 | 8/1974 | Edenborough et al. | 416/223 |
| 3,874,820 | 4/1975 | Fenaughty | 416/226 |
| 3,967,996 | 7/1976 | Kamov et al. | 416/226 X |
| 4,022,546 | 5/1977 | Drees et al. | 416/226 |
| 4,095,322 | 6/1978 | Scarpati et al. | 29/156.8 P |
| 4,110,056 | 8/1978 | Stevenson | 416/226 X |
| 4,150,920 | 4/1979 | Belko et al. | 416/226 X |

FOREIGN PATENT DOCUMENTS

| | | | |
|---|---|---|---|
| 1009798 | 6/1952 | France | 416/226 |
| 1556422 | 12/1968 | France | 416/226 |

*Primary Examiner*—Everette A. Powell, Jr.

[57] ABSTRACT

A helicopter main rotor blade comprised of roll formed structure is provided. A C-shaped nose spar, a closure channel, a protective strip and a nose block are all roll formed. The nose spar extends the length of the leading edge of the helicopter blade, and is open to the rear between upper and lower trailing edge skins. The nose spar is flared adjacent the root whereby the trailing edges of the nose spar diverge from the leading edge as the nose spar extends toward the blade root. The closure channel is attached to the inside surfaces of the upper and lower trailing edges of the nose spar. The closure channel diverges from the leading edge as it extends toward said root. The protective strip is secured to a lead portion of the nose spar to capture a nose block against the leading edge of the nose spar. A trailing blade skin is held against upper and lower outer trailing surfaces of the nose spar by means of body doublers extending from the trailing edges of the protective strip and overlaying the trailing edges of the spar over the closure channel. Flats exist because the airfoil element comprising the upper and lower trailing edges of the nose spar and the closure channel diverge from normal positions in the airfoil. The flat diverges with the flare of the spar and is faired into blade contour. Where the flat extends to a section of the airfoil thinner than the flat, it is faired into the airfoil with a bulge aft.

17 Claims, 5 Drawing Figures

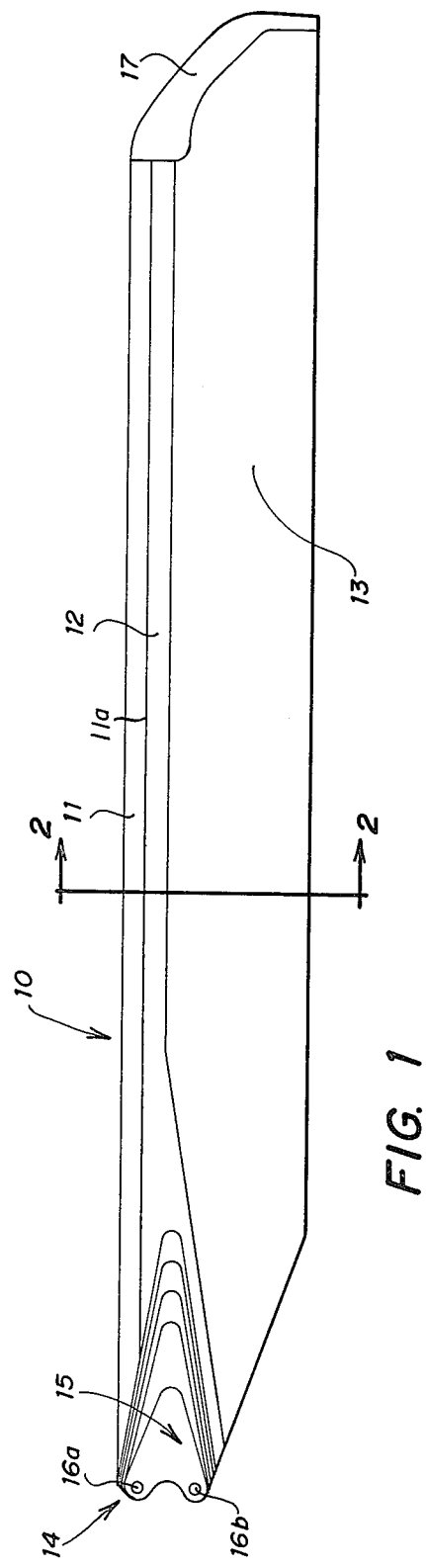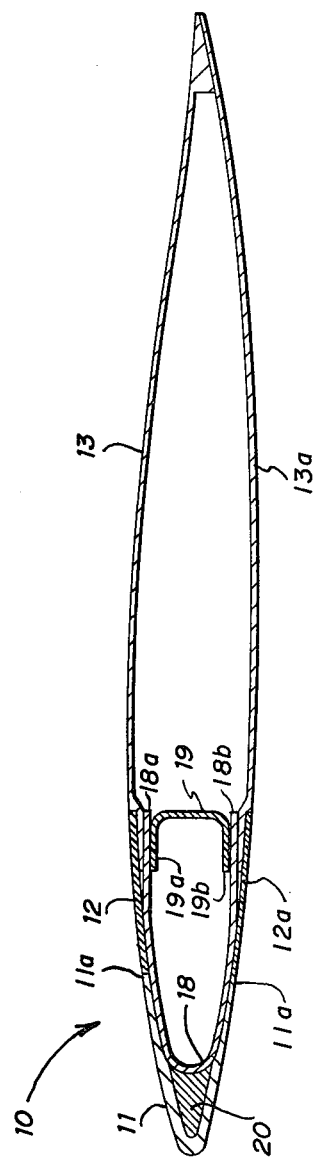

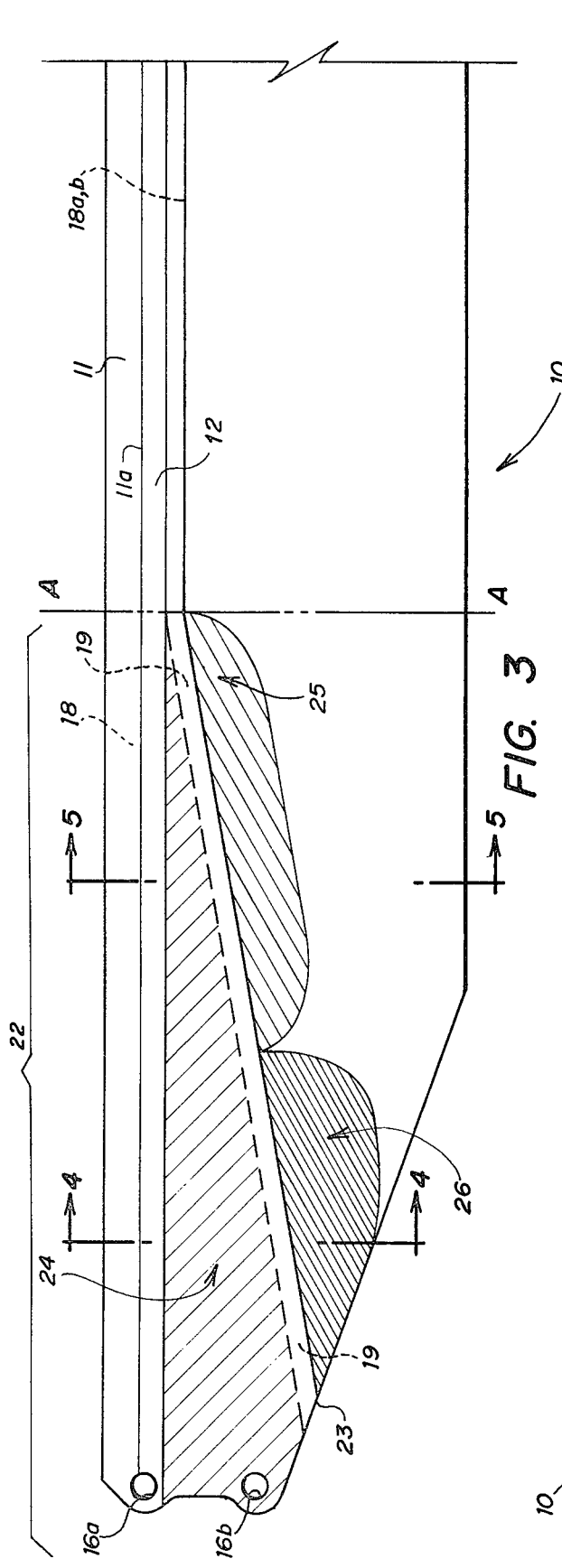
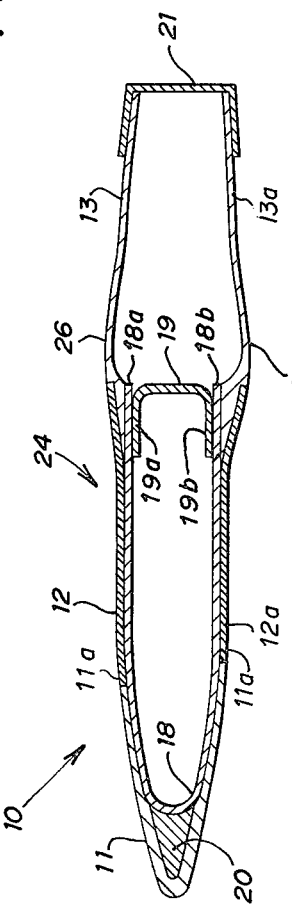
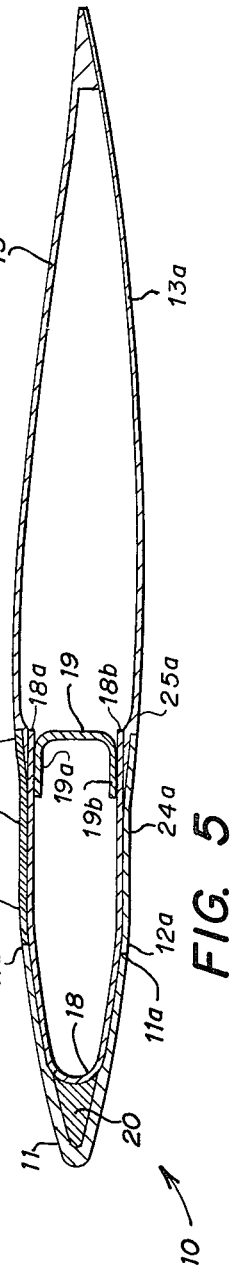

ROLL FORMED BLADE STRUCTURE

FIELD OF THE INVENTION

The invention relates to helicopter main rotor blade structures, and more particularly to the combination of a main rotor blade having a diverging closure channel and roll formed component parts.

PRIOR ART

In helicopter aircraft, the main rotor blades provide the primary lift forces for supporting the aircraft in flight. The main rotor blades are attached to rotate with the rotor mast. Conventionally, each main helicopter rotor blade comprises a nose spar extending the length of the blade with one end coupled to the rotor mast. The nose spar provides the main centrifugal load path between the blades and mast. A trailing skin is attached to and supported by the nose spar to provide lift surfaces. A tip member is attached to the outboard end of the nose spar to seal the outer end of the blade. A trailing closure channel extends along and is attached to the interior of the nose spar. The remainder of the blade is filled with lightweight material to give the blade rigidity.

An improvement to rotor blade structures includes a nose spar extending the length of the leading edge of the blade and open to the rear between upper and lower trailing flanges. A mating channel closure member extends along the length of the nose spar and is attached to the inside trailing surfaces of the upper and lower flanges. The trailing portion of the blade is comprised of a skin filled with lightweight material. Such improvements are disclosed in copending Application Ser. No. 470,520 filed May 16, 1974, now U.S. Pat. No. 4,120,610 which is assigned to the assignee of the present invention.

The main rotor blade structures heretofore used have required stretch formed component parts with resulting high manufacturing costs. The present invention provides a main rotor blade structure wherein roll formed component parts may be used in a blade having a closure channel which diverges aft at the blade root thereby increasing strength while significantly decreasing manufacturing costs.

SUMMARY OF THE INVENTION

A helicopter main rotor blade structure is provided which may be comprised of roll formed component parts. The blade has a flat area in the nose spar adjacent the root of the blade. A bulge area borders said flat area on the aft side. More particularly, a C-shaped nose spar, a closure channel, a protective strip and a nose block are roll formed. The C-shaped nose spar extends the length of the leading edge of the blade, and is open to the rear between upper and lower trailing edges. The trailing edges of the nose spar diverge from the leading edge of the blade as the nose spar extends longitudinally toward said root. The closure channel extends along the length of the nose spar, and is bonded to the inside surfaces of the upper and lower trailing edges of the nose spar. The closure channel likewise diverges aft with the trailing edges of the nose spar. The protective strip is secured to a lead portion of the nose spar to form the forward edge of the blade, and to capture the nose block between the protective strip and the nose spar. Trailing blade skins overlay trailing surfaces of the nose spar coincidental with the closure channel. The blade skins are bonded in place to the inside portion of the nose spar and to body doublers, and extend rearward from the trailing edges of the protective strip to overlay the closure channel.

DESCRIPTION OF THE DRAWINGS

For a more complete understanding of the present invention and for further objects and advantages thereof, reference may now be had to the following description taken in conjunction with the accompanying drawings in which:

FIG. 1 is a top plan view of a main helicopter rotor blade in accordance with the invention;

FIG. 2 is a sectional view of the blade taken along lines 2—2 of FIG. 1;

FIG. 3 is an enlarged plan view of the root end of the blade of FIG. 1;

FIG. 4 is a sectional view of the blade taken along lines 4—4 of FIG. 3; and;

FIG. 5 is a sectional view taken along lines 5—5 of FIG. 3.

DESCRIPTION OF THE PREFERRED EMBODIMENT

Referring to FIG. 1, a top plan view of a main helicopter rotor blade 10 is illustrated. Blade 10 includes a protective strip 11 having trailing edges 11a which extends along the length of the leading edge of the blade. A body doubler 12 also extends the length of the blade, and rearward from the trailing edge of the protective strip 11. The rear portion of the blade 10 comprises a blade skin 13 held in place by body doubler 12.

A blade attachment area 14 is provided on the inboard or root end of blade 10 for connection to a hub grip of a rotating mast in accordance with conventional helicopter design. As will be hereinafter described in detail, the blade cross section configuration undergoes a transition or change in shape in this root area. The blade attachment area 14 includes upper and lower grip plates 15 with fore and aft bushings 16a and 16b, respectively, for receiving fasteners to attach the blade to the hub grip. An outboard end tip 17 is secured to a spar yet to be described and to skins 13.

FIG. 2 is a vertical cross sectional view of the main rotor blade 10 outboard of the root or transition portion of the blade. A C-shaped nose spar 18 extends the length of the leading edge of the blade 10, and is open to the rear between upper and lower trailing edges 18a and 18b. A closure channel 19 extends along the length of the nose spar, and includes upper and lower flanges 19a and 19b extending forward and bonded to the inner surfaces of and edges 18a and 18b, respectively. The trailing surface 192 of channel 19 is vertically aligned with edges 18a and 18b. In the preferred embodiment, channel 19 is a right angle channel with a continuous cross section along its length. As will be hereinafter described in detail channel 19 and edges 18a and 18b diverge off at an angle from the leading edge in the root area. The protective strip 11 is shaped to form the leading shape edge of the blade 10, and is bonded to a lead portion of the nose spar 18. A nose block 20 thereby is captured between and bonded to the protective strip and the forwardmost edge of the nose spar 18. Upper and lower body doublers 12 and 12a are bonded to trailing portions of the nose spar 18, and extend rearward from the trailing edges of the protective strip 11 to trap the forward portions of blade skins 13 and 13a which overlay the forward extending flanges 19a and 19b of closure channel 19 and the outer surface of edges 18a and 18b. The trailing edges of the blade skins 13 and 13a are attached together by conventional means as shown.

In accordance with the invention, the protective strip 11, the closure channel 19, the nose spar 18 and the nose block 20 may be roll formed. In the preferred embodiment described herein, the interior of the nose spar 18 is filled with an aluminum honeycomb such as that manufactured and sold by Hexcel Corporation of Dublin, California as Hexcel No. 5052. Further, the trailing blade portion between skins 13 and 13a may be filled with a non-metal honeycomb such as a reinforced nylon fiber manufactured and sold by Hexcel Corporation of Dublin, California as Hexcel No. HRH-10. Preferably skins 13 and 13a are of fiberglass such as SP250 SF manufactured and sold by 3M Company of Minneapolis, Minnesota. The nose block 20 may be of a suitable roll forged steel.

In FIGS. 3, 4 and 5 the root area 22 is shown in detail. As channel 19 and nose spar 18 extend inboard past inside of reference line A—A, the channel 19 and trailing edges 18a and 18b diverge aft and terminate at a point 23 aft of bushing 16b. That is, the nose spar 18 becomes wider with the trailing portions thereof becoming parallel. Channel 19 is formed by forcing a length of material through a roll forming die and then bending the channel as at line A—A to form the divergent root portion. Nose spar 18 is formed by forcing a length of material through a roll forming die of proper shape and then removing material from the trailing edges to form the divergent root area.

Because of the divergence aft of edges 18a and 18b and channel 19 from a line parallel to the leading edge of blade 10, some unusual profiles are present in the root area and they have been generally identified in FIG. 5 as: (a) flat area 24 where the flanges of nose spar 18 are parallel, (b) faired area 25 where the flat area 24 is thinner than an extension of the outboard portions, and (c) bulge 26 where the flat portion 24 is thinner than such extension.

Flat area 24, FIG. 3 (shown cross hatched) and shown in FIG. 5 is formed in nose spar 18 forward of edges 18a and 18b by reason of the divergence of channel 19. A similar area 24a is present on the other side. Aft of the flat areas 24 and 24a where the blade is thinner than the normal airfoil profile of FIG. 2, faired areas 25 and 25a, FIG. 5, are formed in the profile of the blade. Aft of the flat areas 24 and 24a where blade area is thicker than the normal airfoil profile of FIG. 2 outside bulges 26 and 26a, FIG. 4, are formed in the profile of the blade. The faired portions and the bulged portions serve as transitions between the flat areas and the normal blade contour. An edge spar 21 closes the trailing edge of the blade in the transition area.

Having described the invention in connection with certain specific embodiments thereof, it is to be understood that further modifications may now suggest themselves to those skilled in the art and it is intended to cover such modifications as fall within the scope of the appended claims.

What is claimed is:

1. A main rotor blade extending along its longitudinal dimension between an outboard tip and an inboard root end from which a connection may be made to a hub grip of a rotating mast, and including roll formed members, which comprises:

(a) a C-shaped nose spar open rearward between trailing edges thereof wherein said nose spar is flared aft in the portion of the blade adjacent the root whereby the trailing edge of said nose spar diverges from the leading edge of the blade as said nose spar extends toward said root;
 (b) a channel closure secured to the inner surfaces of said trailing edges;
 (c) a protective strip bonded to upper and lower outer surfaces of a forward section of said nose spar;
 (d) a nose block captured by said protective strip against said nose spar;
 (e) blade skins having skin portions overlying trailing upper and lower outer surfaces of said nose spar; and
 (f) body doublers bonded to trailing surfaces of said nose spar rearward of said protective strip to trap said skin portions between said nose spar and said doublers.

2. The blade of claim 1 wherein said channel closure has an outboard portion which extends longitudinally through said blade parallel to said leading edge and an inboard portion which extends toward said root and diverges away from said leading edge to conform to the diverging trailing edge of said nose spar.

3. The blade of claim 2 wherein a fore bushing and an aft bushing are provided in said root of said blade and wherein said channel closure diverges aft and terminates at a point aft of said aft bushing.

4. The blade of claim 1 wherein said channel closure has a uniform cross section along its length.

5. The blade of claim 1 comprising a flat area in said nose spar adjacent said root.

6. A main rotor blade including roll formed members, which comprises:

(a) a C-shaped nose spar open rearward between trailing edges thereof;
 (b) a channel closure secured to the inner surfaces of said trailing edges;
 (c) a protective strip bonded to upper and lower outer surfaces of a forward section of said nose spar;
 (d) a nose block captured by said protective strip against said nose spar;
 (e) blade skins having skin portions overlying trailing upper and lower outer surfaces of said nose spar; and
 (f) body doublers bonded to trailing surfaces of said nose spar rearward of said protective strip to trap said skin portions between said nose spar and said doublers;
  said blade extending along its longitudinal dimension between an outboard tip and an inboard root end from which a connection may be made to a hub grip of a rotating mast;
  said nose spar being flared aft along the portion of the blade adjacent the root whereby the trailing edge of said nose spar diverges from the leading edge of the blade as said nose spar extends toward said root;
  the blade comprising a flat area in said nose spar adjacent said root and a bulge area on said blade aft of said flat area.

7. The blade of claim 2 wherein said channel closure is a right angle channel with a uniform constant height cross section along its length.

8. A main rotor blade extending along its longitudinal dimension between an outboard tip and an inboard root end from which a connection may be made to a hub grip of a rotating mast, and having a roll formed structure extending the longitudinal length of the blade, which comprises:
  (a) nose spar means opens toward the trailing edge of said blade wherein said nose spar means is flared along the portion of the blade adjacent the root whereby the trailing edge of said nose spar means diverges from the leading edge of the blade as said nose spar means extends towards said root;
  (b) spar closure means seated within and closing off the open end of said nose spar means;
  (c) a nose block in mating relation with a forward outer surface of said nose spar means;
  (d) an arch shaped means forming the leading edge of said blade and capturing said nose block against said nose spar means; and
  (e) opposing body doubles bonded to trailing outer surfaces of said nose spar means for trapping blade skins overlying said closure means.

9. The blade of claim 8 wherein said spar closure means has an outboard portion which extends longitudinally through said blade parallel to said leading edge and an inboard portion which extends toward said root and diverges away from said leading edge to conform to the diverging trailing edge of said nose spar means.

10. The blade of claim 9 wherein fore and aft bushings are provided in the root of said blade and wherein said spar closure means terminates at a point which is aft of said aft bushing.

11. The blade of claim 9 wherein said spar closure means has a continuous cross section along its length.

12. The blade of claim 8 comprising a flat area in said nose spar means adjacent said root.

13. A main rotor blade having a roll formed structure extending the longitudinal length of the blade, which comprises:
  (a) nose spar means open toward the trailing edge of said blade;
  (b) nose spar closure means seated within and closing off the open end of said nose spar means;
  (c) a nose block in mating relation with a forward outer surface of said nose spar means;
  (d) an arch shaped means forming the leading edge of said blade and capturing said nose block against said nose spar means; and
  (e) opposing body doublers bonded to trailing outer surfaces of said nose spar means for trapping blade skins overlying said closure means;
  the blade extending along its longitudinal dimension between an outboard tip and an inboard root end from which a connection may be made to a hub grip of a rotating mast;
  said nose spar means being flared along the portion of the blade adjacent the root whereby the trailing edge of said nose spar means diverges from the leading edge of the blade as said nose spar means extends toward said root;
  the blade comprising a flat area in said nose spar means adjacent said root and a bulge area on said blade aft of said flat area.

14. The blade of claim 9 wherein said spar closure means is a right angle channel with a uniform constant height cross section along its length.

15. A main rotor blade comprising:
  a C-shaped nose spar open rearward between trailing edges thereof;
  a channel closure secured to the inner surface of said trailing edges;
  blade skin means extending aft from said nose spar;
  said blade extending along its longitudinal dimension between an outboard tip and an inboard root end from which a connection may be made to a hub grip of a rotating mast;
  said nose spar being flared aft along the portion of the blade adjacent the root whereby the trailing edge of said nose spar diverges from the leading edge of the blade as said nose spar extends toward said root;
  said channel closure having an outboard portion which extends longitudinally through said blade parallel to said leading edge and an inboard portion which extends toward said root and diverges away from said leading edge to conform to the trailing edge of said nose spar.

16. The blade of claim 15 wherein said channel closure has a uniform constant height cross section along its length.

17. The blade of claim 16 comprising a flat area in said nose spar adjacent said root and a bulge area on said blade aft of said flat area.

* * * * *